United States Patent
Wang et al.

(10) Patent No.: US 11,082,638 B2
(45) Date of Patent: Aug. 3, 2021

(54) LIVE STREAMING SYSTEM AND METHOD FOR LIVE STREAMING

(71) Applicant: ATEN International Co., Ltd., New Taipei (TW)

(72) Inventors: Li-Ying Wang, New Taipei (TW); Yu-Ting Wang, New Taipei (TW); Chia-Chih Chen, New Taipei (TW); Hsiang-Jui Yu, New Taipei (TW)

(73) Assignee: ATEN International Co., Ltd., New Taipei (TW)

( * ) Notice: Subject to any disclaimer, the term of this patent is extended or adjusted under 35 U.S.C. 154(b) by 0 days.

(21) Appl. No.: 16/425,188

(22) Filed: May 29, 2019

(65) Prior Publication Data

US 2019/0387182 A1   Dec. 19, 2019

(30) Foreign Application Priority Data

Jun. 19, 2018 (TW) .................. 107120934

(51) Int. Cl.
*H04N 5/268* (2006.01)
*G06T 11/60* (2006.01)
(Continued)

(52) U.S. Cl.
CPC ............. *H04N 5/268* (2013.01); *G06T 11/60* (2013.01); *H04N 5/272* (2013.01); *H04N 21/2187* (2013.01); *H04N 21/4223* (2013.01)

(58) Field of Classification Search
CPC .... H04N 5/268; H04N 5/272; H04N 21/2187; H04N 21/4223; G06T 11/60; G06T 11/00
See application file for complete search history.

(56) References Cited

U.S. PATENT DOCUMENTS 5,566,251 A * 10/1996 Hanna .................. H04N 5/272
                                                                  348/588
8,217,997 B2 * 7/2012 Solomon ............... G06F 3/0386
                                                                  348/63
(Continued)

FOREIGN PATENT DOCUMENTS

CN        101115150 A     1/2008
CN        101272469 A     9/2008
(Continued)

OTHER PUBLICATIONS

Taiwanese Office Action, dated Jun. 14, 2019, in a counterpart Taiwanese patent application, No. TW 107120934.

(Continued)

*Primary Examiner* — Padma Haliyur
(74) *Attorney, Agent, or Firm* — Chen Yoshimura LLP

(57) ABSTRACT

A live streaming system communicatively connected to a first camera, where the first camera captures an original image. The live streaming system includes a controller and an electronic device. The controller can send a prompt signal via the image captured by the first camera. The electronic device communicates with the controller and the first camera, and includes a processor and a network interface device. The processor recognizes the prompt signal in the captured image, and in response thereto, processes the original image to generate a synthesized image; it further analyzes the prompt signal to determine the location of the synthesized image. The network interface device is electrically connected to the processor and live streams the synthesized image.

18 Claims, 6 Drawing Sheets

(51) Int. Cl.
*H04N 5/272* (2006.01)
*H04N 21/2187* (2011.01)
*H04N 21/4223* (2011.01)

(56) References Cited

U.S. PATENT DOCUMENTS

| | | | |
|---|---|---|---|
| 9,684,435 B2* | 6/2017 | Carr | G11B 27/34 |
| 10,129,582 B2* | 11/2018 | Verticchio | G11B 27/28 |
| 10,809,740 B2* | 10/2020 | Reinert | G06T 7/73 |
| 2008/0111922 A1 | 5/2008 | Ferri et al. | |
| 2013/0215214 A1 | 8/2013 | Dhopte et al. | |
| 2017/0294135 A1* | 10/2017 | Lechner | G09B 9/301 |
| 2019/0051053 A1* | 2/2019 | Sit | H04N 21/00 |

FOREIGN PATENT DOCUMENTS

| | | |
|---|---|---|
| CN | 100559846 C | 11/2009 |
| CN | 107452067 A | 12/2017 |
| TW | I420405 B | 12/2013 |

OTHER PUBLICATIONS

Chinese Office Action, dated May 7, 2021, and Search Report dated Apr. 25, 2021, in a counterpart Chinese patent application, No. CN 201811502817.3.

Taiwanese Office Action, dated May 17, 2021, in a counterpart Taiwanese patent application, No. 107120934.

* cited by examiner

501a

501b

LIVE STREAMING SYSTEM AND METHOD FOR LIVE STREAMING

BACKGROUND OF THE INVENTION

Field of the Invention

This invention relates to a video playing system and related method, and in particular, it relates to live streaming system and related method.

Description of Related Art

Live streaming is a popular activity on social media and other online forum. Currently there are some applications for smartphones that provide live streaming functions. However, such software can only provide simple streaming functions, where the streamed images tend to be simple and lacking varieties. Conventional devices used for directing broadcast programs can generate rich live broadcast images, but requires cooperation of multiple operators, which limit its application in many situations.

SUMMARY

Embodiments of the present invention is directed to a live streaming method, which uses a prompt signal in the original image to generate synthesized images, so as to enhance the varieties of live streamed images.

Embodiments of the present invention is also directed to a live streaming system which uses the above method to perform live streaming.

In the live streaming method according to an embodiment of the present invention, first, an original image is captured. A prompt signal is detected in the original image. Then, based on the prompt signal, the original image is processed to generate a synthesized image. The prompt signal is analyzed to determine a position of the synthesized image. A superimposed image is generated by superimposing the synthesized image on the original image, wherein the synthesized image appears at the determined position of the original image. The superimposed image is live streamed.

In one embodiment, the superimposed image is generated by superimposing the synthesized image on the original image.

In one embodiment, the position of the synthesized image is determined based on the position of the detected prompt signal.

In one embodiment, the synthesized image includes a main-sub image window, a text window, a zoom window, a handwriting window, or their combination.

In another aspect, the present invention provides a live streaming system configured to be connected to a first camera, where the first camera is configured to capture an original image. The live streaming system includes a controller and an electronic device. The controller generates a prompt signal to be captured by the first camera. The electronic device is connected to the controller and the first camera. The electronic device includes a processor and a network interface unit. The processor recognizes the prompt signal in the original image, and based thereon, processes the original image to generate a synthesized image. The processor also analyzes the prompt signal to determine the position where the synthesized image is to appear. The processor generates a superimposed image by superimposing the synthesized image on the original image, wherein the synthesized image appears at the determined position of the original image. The network interface unit is connected to the processor and live streams the superimposed image.

In one embodiment, the controller further transmits image processing signals to the processor. The processor, based on the received image processing signals and the prompt signal, determines the content of the synthesized image and the position where it appears.

In one embodiment, the live streaming system is further connected to a second camera. The second camera captures target images. The processor generates a synthesized image based on the image processing signals, where the superimposed image is formed by the processor by superimposing the target image on the original image.

Based on the above, the live streaming system according to embodiments of the present invention can use the prompt signal, which is generated by the controller for capture by the camera (e.g. the first camera), to generate synthesized images and to live stream superimposed image containing the synthesized images, which improves the varieties of the live streamed image.

To further illustrates the above and other characteristics and advantages of the present invention, embodiments of the invention are described below in more detail by referring to the following drawings.

DETAILED DESCRIPTION OF PREFERRED EMBODIMENTS

Figure 1A:
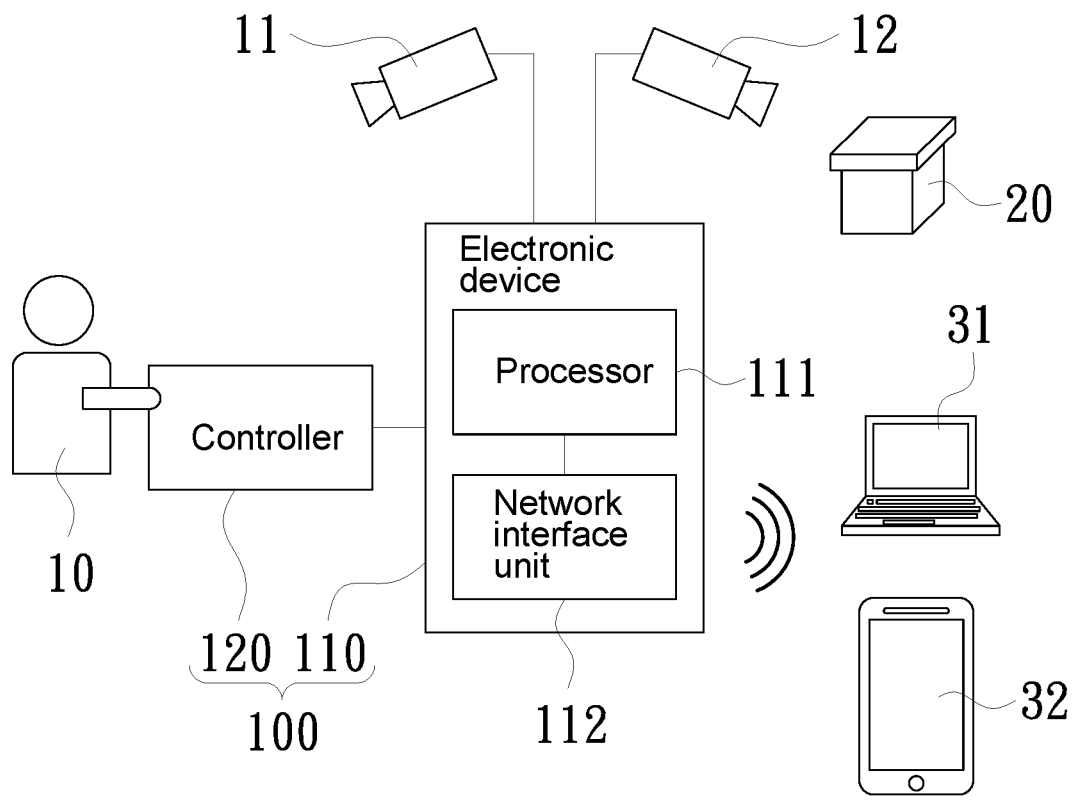
FIG. 1A is a schematic block diagram showing a live streaming system according to an embodiment of the present invention.

FIG. 1A is a schematic block diagram showing a live streaming system according to an embodiment of the present invention. Referring to FIG. 1A, the live streaming system 100 generates a live streaming image for the broadcaster 10 (the person presenting the live streaming), which can be played at terminals of a viewer via a wired or wireless network such as the internet. In the examples shown in FIG. 1A, the terminals may include a notebook computer 31 or a smartphone 32. In other examples, the terminal may also be a tablet computer, desktop computer, smart television, etc. Thus, the live streaming system 100 can live stream images via a network on not only a notebook computer 31 or smartphone 32, but also a tablet computer, desktop computer, or smart television.

The live streaming system 100 is communicatively connected to at least one camera. In the embodiment of FIG. 1A, the live streaming system 100 is communicatively connected to two cameras, namely, first camera 11 and second camera 12. In other embodiments, the live streaming system 100 may be connected to only one camera, or three or more cameras. Thus, the number of cameras shown in FIG. 1A is only an example and not limiting.

The image captured by the first camera 11 may be used as at least a part of the live streamed image to be generated. For example, the first camera 11 may be used to capture the primary image of the live streaming image, so the live streaming image played at the terminal (e.g. notebook computer 31 or smartphone 32) is primarily constituted by the image captured by the first camera 11. In other words, the first camera 11 is the main camera, and can be pointed at the broadcaster 10 or the object or scene that the broadcaster 10 wishes to present to the viewer.

The image captured by the second camera 12 may also be used as at least a part of the live streamed image to be generated. For example, the second camera 12 may be used to capture a secondary image of the live streaming image, and the secondary image and the primary image captured by the first camera 11 may form a main-sub image relationship, such as picture-of-picture (POP), picture-in-picture (PIP), picture-in-graphic (PIG), etc. The first camera 11 and the second camera 12 may be networked cameras, or built-in cameras of a notebook computer, etc.

The live streaming system 100 includes a controller 120 and an electronic device 110. The electronic device 110 is communicatively connected to the controller 120, first camera 11 and second camera 12, via wired and/or wireless connections. For example, the electronic device 110 may be connected to the first camera 11 and second camera 12 via wired connections, and connected to the controller 120 via a wireless connection. Alternatively, the electronic device 110 may be connected to all of the second camera 12, first camera 11 and second camera 12 via wireless connections.

The wired connection may be implemented by communication ports, which may be HDMI (High Definition Multimedia Interface) or VGA (Video Graphics Array) ports, for connecting to the cameras (e.g. the first camera 11 and second camera 12), and a serial port for connecting to the controller 120, where the serial port may be USB (Universal Serial Bus). The wireless connection may be implemented by Bluetooth or Wi-Fi connection.

The electronic device 110 includes a processor 111 and a network interface unit 112, and may be a computer (notebook to desktop), a smartphone, or a tablet. The network interface unit 112 is electrically coupled to the processor 111, and the processor 111 is configured to have digital image processing (DIP) functions. More specifically, the processor 111 is configured to recognize specific objects in the image captured by the first camera 11, and analyze the position of such objects in the captured image. For example, the specific object may be a physical object of a certain shape, a graphic, or a light spot having a predefined color or shape formed by a light beam illuminating an object or surface. The light beam may be visible or invisible light (e.g. ultraviolet or infrared lights). Further, the processor 111 is configured to generate a synthesized image based on the recognized object, and the network interface unit 112 streams a superimposed image containing the synthesized image live via the network, to be played at the notebook computer 31 or smartphone 32 for viewing by the viewer.

Figure 1B:
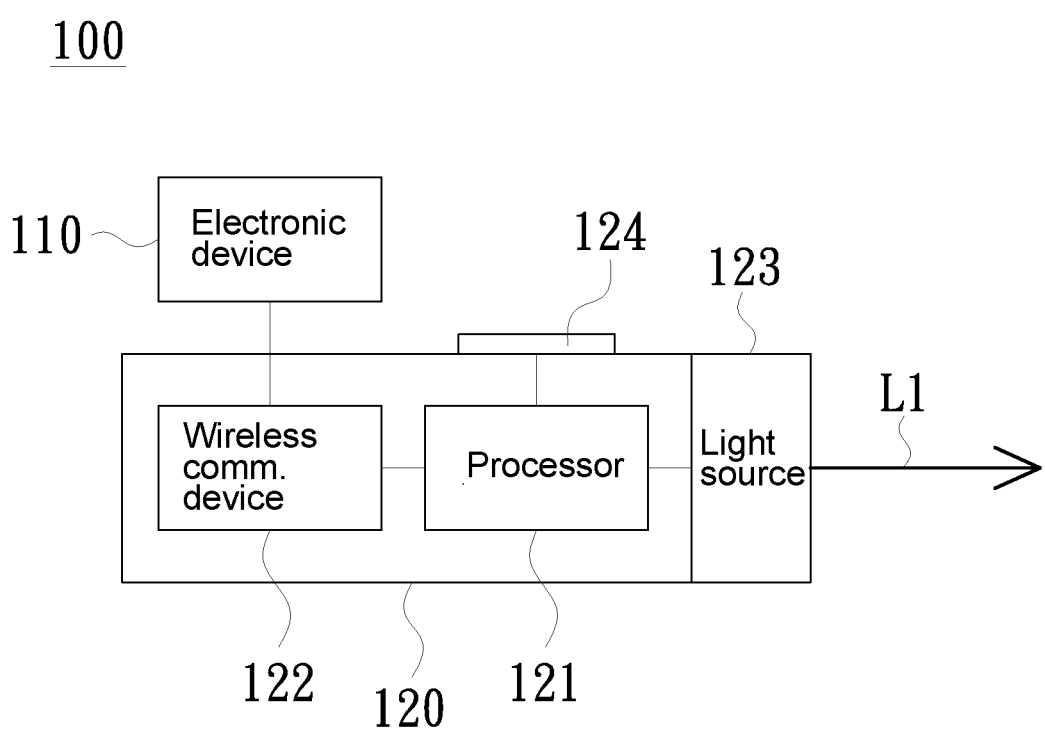
FIG. 1B is a schematic block diagram showing the control device in the embodiment of FIG. 1A.

FIG. 1B is a schematic block diagram showing the control device in the embodiment of FIG. 1A. Referring to FIGS. 1A and 1B, the controller 120 includes a processor 121, wireless communication device 122, light source 123 and switch 124. The processor 121 is electrically coupled to the wireless communication device 122, light source 123 and switch 124. The processor 121 may be, for example. a microprocessor, and the wireless communication device 122 may be, for example, a Bluetooth device or a Wi-Fi device, where the controller 120 may be connected to the electronic device 110 via the communication device 122. The light source 123 may be a light emitting diode or a semiconductor laser, and can emit a light beam L1 which may be visible or invisible light. The switch 124 may include a push button, which may be pressed by the user (e.g. the broadcaster 10) to operate the controller 120, so that the processor 121 controls the light source 123 to emit the light beam L1.

Figure 2:
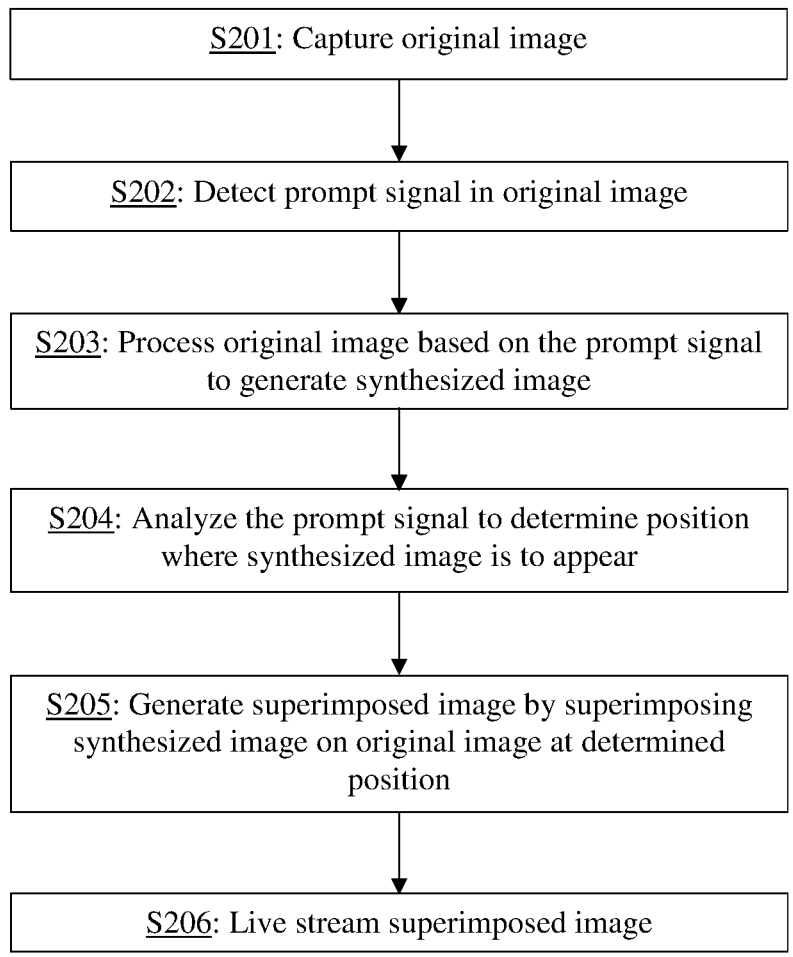
FIG. 2 is a flow chart illustrating a live streaming method executed by the live streaming system of FIG. 1A.
Figure 3A:
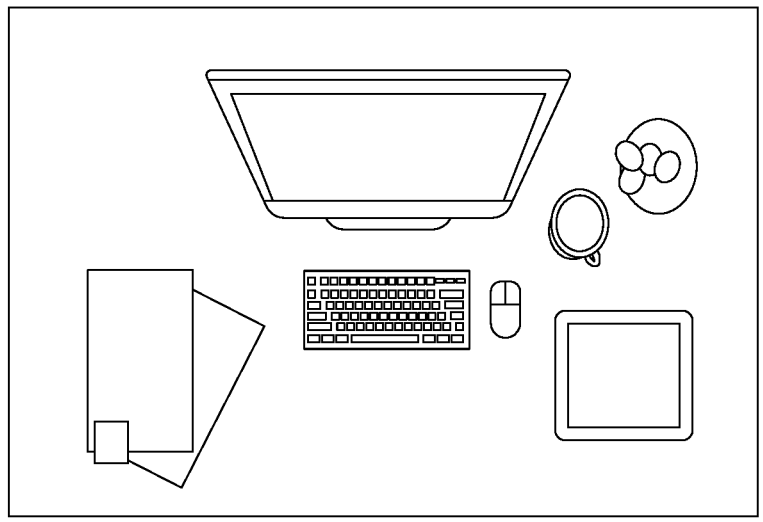
FIG. 3A depicts an original image captured by the first camera in the system of FIG. 1A.

Refer to FIGS. 1A, 2 and 3A, where FIG. 2 is a flow chart illustrating a live streaming method according to an embodiment of the present invention. The live streaming system 100 executes the live streaming method described in FIG. 2, to live stream images to terminals such as notebook computer 31 or smartphone 32. In the live streaming method of this embodiment, first, step S201 captures an original image 300 (as shown in FIG. 3A). The original image 300 is captured by the first camera 11; it is the raw imaged captured by the first camera 11 which has not been post processed.

Figure 3B:
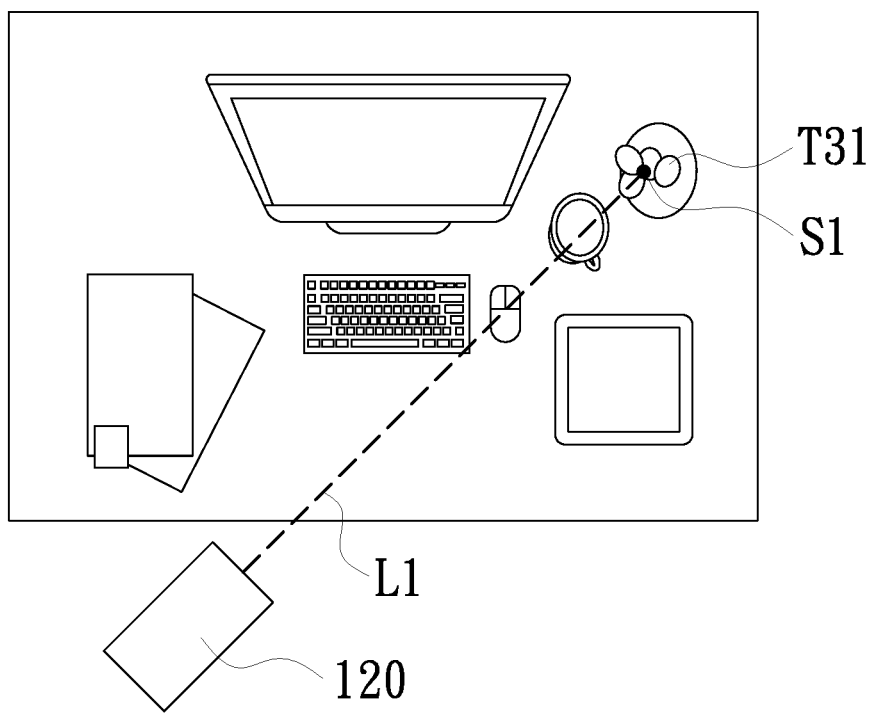
FIG. 3B schematically illustrates the generation of a synthesized image in the method of FIG. 2.

Referring to FIGS. 1A, 2 and 3B, then, in step S202, the prompt signal S1 is detected in the original image. The prompt signal S1 is the object in the original image 300 that is recognized by the processor 111, which may be an image of a physical object or a light spot formed by the light beam. In the embodiment shown in FIG. 3B, the prompt signal S1 is a light spot formed by the light beam, so the prompt signal S1 is issued by the controller 120. The controller 120 issues the prompt signal S1 to be captured by the first camera 11, so that the prompt signal S1 appears in the original image 300. In the example of FIG. 3B, the prompt signal S1 is a light spot formed by the light beam L1 illuminating on a physical object T31, where the shape of the light spot may be round, rectangular, triangular, or a specific logo, etc. In this example, the object T31 is a product (cookie) that the broadcaster 10 wishes to present to the viewer. The first camera 11 captures the light spot (prompt signal S1) in its image, so that the prompt signal S1 is present in the original image 300. In other examples, the prompt signal S1 generated by the controller 120 may alternatively be a specific shape that the first camera 11 can recognize, such as the shape of the controller 120 itself or graphics, letters, or any other three dimensional or two dimensional physical image characteristics that can be recognized. In these embodiments, the controller 120 is not required to use the light beam L1 emitted by the light source 123 as the prompt signal S1, so the controller 120 may omit the light source 123.

Figure 3C:
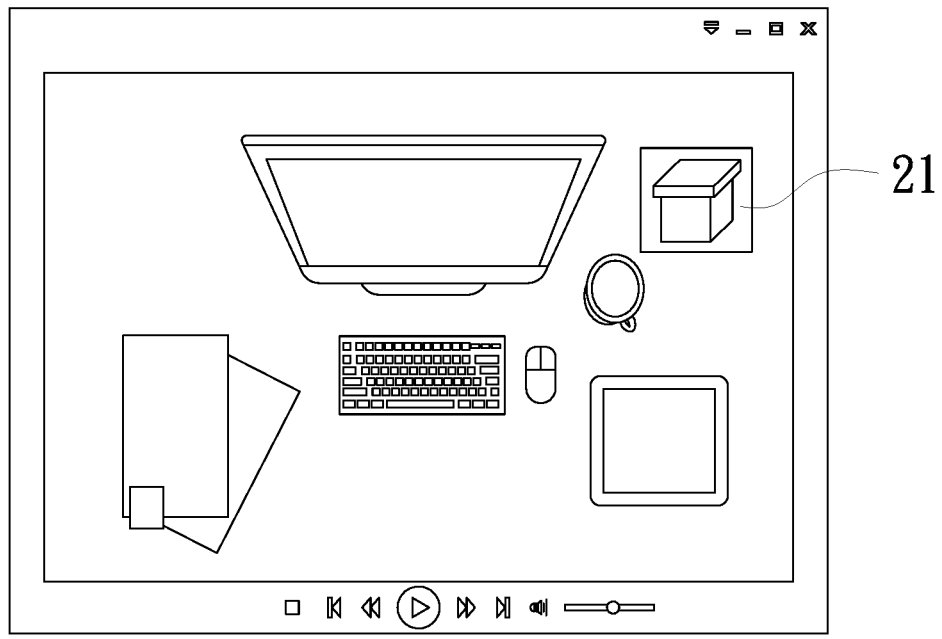
FIG. 3C depicts a live streamed image generated by the live streaming system of FIG. 1A.

Referring to FIGS. 2, 3B and 3C, in the next step S203, the original image 300 is processed based on the prompt signal S1 to generate a synthesized image 21, which is used to form a video image 301 to be live streamed. The processor 111 can recognize the prompt signal S1 in the original image 300 and generate the synthesized image 21 based on it. For example, the processor 111 may process the area of the original image 300 occupied by the prompt signal S1 and/or the surrounding areas, where the size of the area of the original image 300 to be processed by the processor 111 may be set beforehand by the broadcaster 10 or pre-set in the processor 111. The live streamed image 301 is generated by the processor 111 by superimposing target images (e.g. the synthesized image 21) on the original image 300. The live streamed image 301 containing the synthesized image 21 may be main-sub images such as picture-of-picture (POP), picture-in-picture (PIP), picture-in-graphic (PIG), etc.

The target image may be digital still images or digital video clips, which may be pre-prepared by the broadcaster 10. For example, the digital still images may show text or graphics prepared by the broadcaster 10. In this embodiment, the target image may be digital video, and may be pre-recorded video captured by the second camera 12. Referring to FIGS. 1A and 3C, the target image is generated by the second camera 12 capturing an object 20, so the target image shows the object 20, in this example, the packaging of the corresponding object T31 (cookies). This way, the broadcaster 10 can use the images of objects T31 and 20 to present explanations.

The processor 111 is also configured to determine the positioning of the synthesized image 21 based on the prompt signal S1, in step S204. More specifically, the processor 111 analyzes and detects the position of the prompt signal S1 within the original image 300, and based on this detected position of the prompt signal S1, determines the position where the synthesized image 21 is to appear. After generating the superimposed image by superimposing the synthesized image 21 on the original image 300 at the determined position (step S205), the superimposed image is live streamed (step S206), so as to achieve the live streamed image 301. This way, the live streaming system 100 can live stream, via the network, the live streamed image 301 containing the synthesized image 21 on the terminals such as notebook computer 31 and smartphone 32. The controller 120 is further configured to output image processing signals to the processor 111 of the electronic device 110, and the processor 111 is configured to determine the content and positioning of the synthesized image 21 based on the image processing signals and the prompt signal S1. The processor 111 generates the superimposed image based on the image processing signal, for example, by superimposing the secondary image captured by the second camera 12 on the original image 300.

Because the processor 111 determines the positioning of the synthesized image 21 based on the position of the detected prompt signal S1, when the broadcaster 10 moves the controller 120 and generates a continuous prompt signal S1, the processor 111 will, based on the prompt signal S1 captured by the first camera 11, cause the areas covered by the synthesized image 21 to move within the live streamed image 301 as directed by the controller 120. This way, the broadcaster 10 can use the controller 120 to control the movement of the synthesized image 21 within the live streamed image 301, so as to move or drag the synthesized image 21 to a position as the broadcaster 10 desires.

Figure 4:
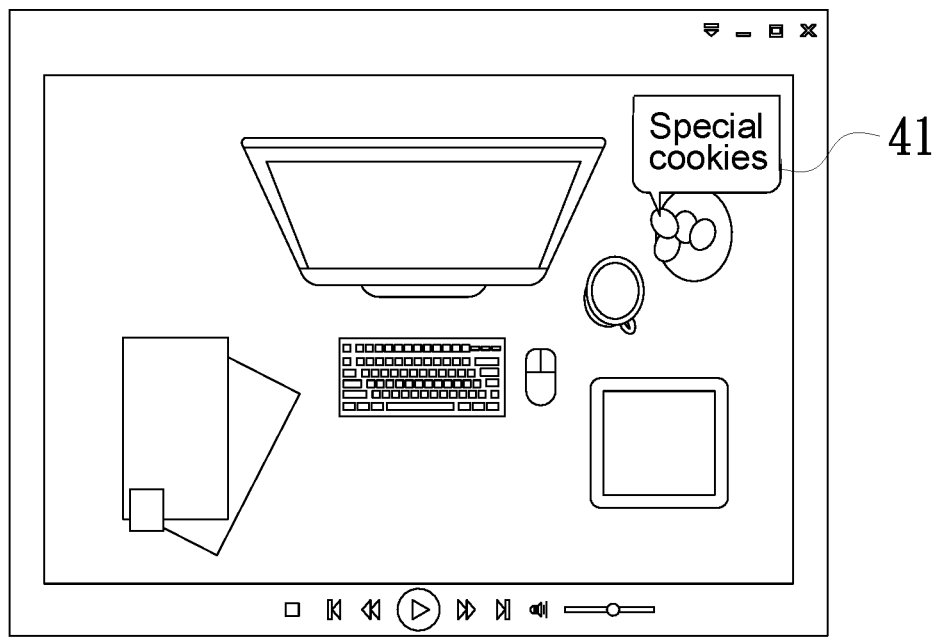
FIG. 4 depicts a live streamed image generated by a live streaming system according to another embodiment of the present invention.

FIG. 4 depicts a live streamed image generated by a live streaming system according to another embodiment of the present invention. Referring to FIG. 4, this embodiment is similar to the earlier described embodiment, and both can execute the live streaming method described in FIG. 2 and can use the live streaming system 100 to achieve live streaming. One difference between the embodiment of FIG. 4 and the earlier described embodiment is that the synthesized images are different. In the live streamed image 401 shown in FIG. 4, the synthesized image 41 is a window containing text, and its shape may be similar to a speech balloon.

Using the text shown in the synthesized image 41, the broadcaster 10 can make explanations to the viewer. For example, the broadcaster 10 can use the text "special cookies" in the synthesized image 41 to explain that the object at the location corresponding to the synthesized image 41 are cookies. The method of generating the synthesized image 41 is the same as the method for generating the synthesized image 21, and both are generated by the processor 111 superimposing a target image on the original image 300, except that the target images used for generating the synthesized image 41 is digital still image rather that digital video.

Figure 5A:
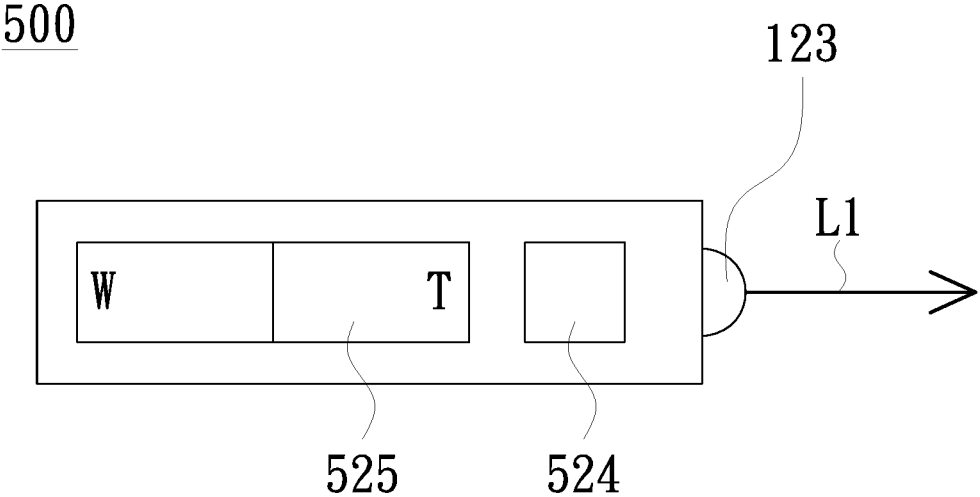
FIG. 5A is a schematic block diagram showing a control device in a live streaming system according to another embodiment of the present invention.

FIG. 5A is a schematic block diagram showing a control device in a live streaming system according to another embodiment of the present invention. Referring to FIG. 5A, the controller 500 is similar to the earlier described controller 120. For example, the controller 500 also includes a communication device 122 (not shown in FIG. 5A), light source 123 (not shown in FIG. 5A), and a processor (not shown in FIG. 5A) having substantially similar functions as the processor 121, and can also be connected to the electronic device 110 (refer to FIG. 1A). Different from the controller 120, the controller 500 additionally includes a writing button 524 and a zoom button 525, and can use the writing button 524 and zoom button 525 to control the electronic device 110 to generate a live streamed image with a variety of visual effects, such as by using the zoom button 525 to control the size of the synthesized image. The writing button 524 and the zoom button 525 are both connected to the internal processor if the controller 500. Further, when the broadcaster 10 press the writing button 524 briefly but does not continuously press it, the controller 500 will continuously generate a light beam L1, to form a prompt signal S1 similar to that shown in FIG. 3B.

Figure 5B:
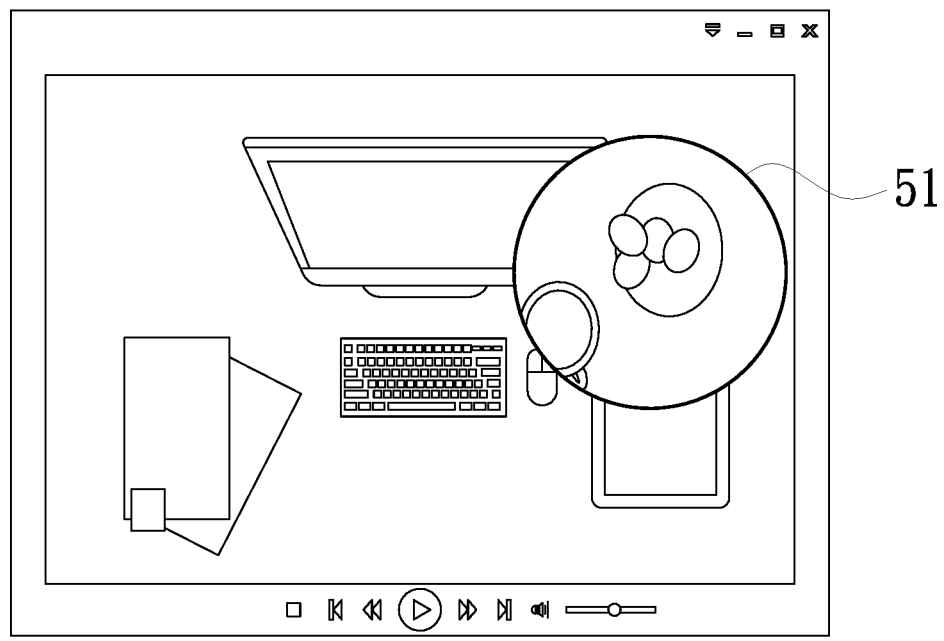
FIG. 5B depicts a live streamed image generated by using the control device of FIG. 5A.

FIG. 5B depicts a live streamed image generated by using the control device of FIG. 5A. Referring to FIGS. 5A and 5B, the live streamed image 501a may be generated using the live streaming method shown in FIG. 2, i.e., the live streamed image 501a is generated based on the prompt signal S1. However, different from the earlier described live streamed images 301 and 401, the live streamed image 501a in the embodiment of FIG. 5B has a synthesized image 51 that is different from the synthesized images 21 and 41.

More specifically, when the light beam L1 is illuminated on the object T31 to form the prompt signal S1 (refer to FIG. 3B), the broadcaster 10 may press the T key of the zoom button 525. In response, the controller 500 transmits an image processing signal to the processor 111 of the electronic device 110 (refer to FIG. 1A). The processor 111, based on the received image processing signal, enlarges the area of the live streamed image 501a around the position indicated by the prompt signal S1 to generate the synthesized image 51, as shown in FIG. 5B.

When the broadcaster 10 presses the W key of the zoom button 525, the controller 500 generates another image processing signal to the processor 111 of the electronic device 110. The processor 111, based on the received other image processing signal, reduces the size of the previously enlarged synthesized image 51. Continuously pressing the W key of the zoom button 5251 can control the processor 111 to reduce the size of the object in the synthesized image 51 to its original unenlarged size, and change the synthesized image 51 back to the prompt signal S1. Thus, the zoom button 525 can control the zooming of the area of the prompt signal S1 and its surrounding areas, such that the synthesized image 51 constitutes a zoom window.

Figure 5C:
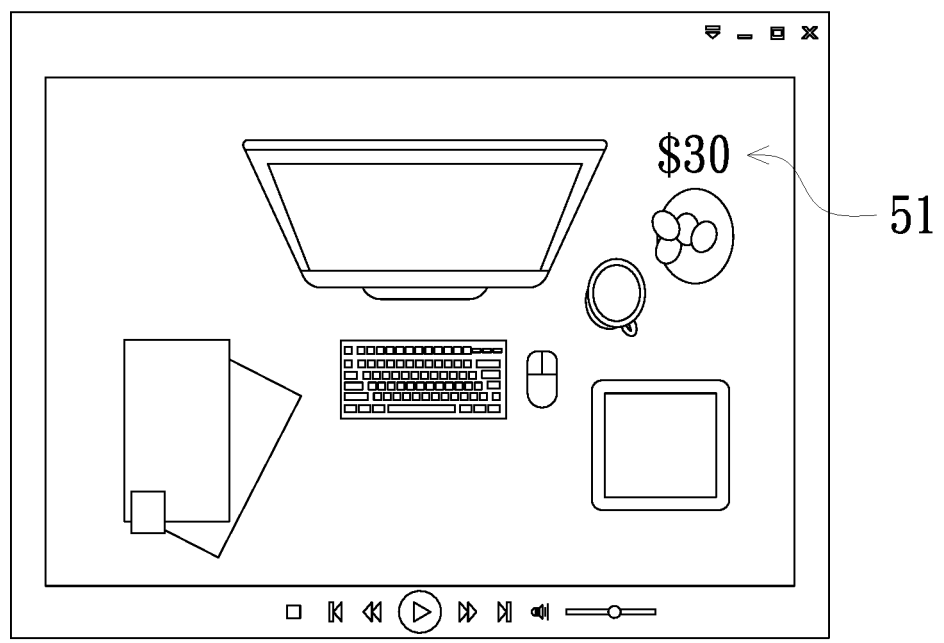
FIG. 5C depicts another live streamed image generated by using the control device of FIG. 5A.

FIG. 5C depicts another live streamed image generated by the control device of FIG. 5A. Referring to FIGS. 5A and 5C, the live streamed image 501b shown in FIG. 5C is also generated based on the prompt signal S1. In the live streamed image 501b shown in FIG. 5C, the prompt signal S1 is present in the original image 300 (refer to FIG. 3B) and detected by the processor 111 of the electronic device 110. At this time, the broadcaster 10 can continuously press the writing button 524, so that the controller 500 transmits an image processing signal for writing to the processor 111. In response to receiving the image processing signal for writing, the processor 111 traces and records the trajectory of the prompt signal S1, and based on the trajectory, generates the synthesized image 51 that constitutes a writing window.

This way, the broadcaster 10 can continuously press the writing button 524, and wave the controller 500 at the same time, to generate a writing effect on the live streamed image 501b. Further, in this embodiment, the processor 111 of the electronic device 110 is configured to have a handwriting recognition function, i.e., the processor 111 can recognize text or patterns from the trajectory of the prompt signal S1. For example, the broadcaster 10 may use the controller 500 to write "$30", so the trajectory of the prompt signal S1 forms a shape similar to "$30". The processor 111 recognizes this trajectory and generates the text "$30" as shown in FIG. 5C. Or, in other examples, the broadcaster 10 may use the controller 500 to draw a heart shaped trajectory, and the processor 111 can recognizes such a trajectory of the prompt signal S1 to generate a heart shaped pattern. Thus, the handwriting recognition function shown in FIG. 5C is only an example; the handwriting recognition function of the processor 111 is not limited to recognizing only text, but includes recognizing other predefined patterns and or generating the corresponding patterns for the synthesized image.

Moreover, in some other embodiments, the processor 111 of the electronic device 110 has no handwriting recognition function, and the processor 111 directly displays the trajectory of the prompt signal S1 on the live streamed image 501b, to display the text or pattern written by the broadcaster 10. Thus, by using the writing button 524 and zoom button 525, the controller 500 can generate and transmit a variety of image processing signals to the processor 111 of the electronic device 110, so that the processor 111 can determine the content of the synthesized image 21 based on the received image processing signals, to generate live streamed image 501a and 501b with rich varieties.

To summarize, in the live streaming system according to embodiments of the present invention, the broadcaster can use the controller to generate prompt signals to be captured by the camera (e.g. the first camera 11) so as to generate synthesized images and to live stream superimposed images that contain the synthesized images, to improve the varieties of the live streamed images. Moreover, the broadcaster can move the controller to drag the synthesized image to any desired location of the live streamed image. Further, the broadcaster can operate the controller to transmit image processing signals to the processor of the electronic device. For example, the broadcaster can press buttons on the controller (e.g. the writing button 524 or zoom button 525) to generate a variety of image processing signals, to generate a variety of synthesized images in the live streamed image, such as main-sub image window, text window, zoom window, handwriting window, or their combination. Therefore, the live streaming system according to embodiments of the present invention has the advantage of simple operations, and can be used by lay persons, so that they can easily use the live streaming system to generate live streamed image with rich varieties.

It will be apparent to those skilled in the art that various modification and variations can be made in the live streaming system and related method of the present invention without departing from the spirit or scope of the invention. Thus, it is intended that the present invention cover modifications and variations that come within the scope of the appended claims and their equivalents.

What is claimed is:

1. A live streaming method, comprising:
   a user-operable, hand-held and dynamically movable external controller generating an illuminating light to form a prompt signal and causing the prompt signal to appear within a physical scene at a position defined solely by a position and/or orientation of the hand-held external controller;
   a camera, distinct from the external controller, capturing an original image of the physical scene, the original image including the prompt signal;
   a processor detecting a prompt signal in the original image, wherein the prompt signal is present in the original image as captured by the camera;
   the processor generating a synthesized image;
   the processor analyzing the prompt signal to determine a position within the original image where the synthesized image is to appear;
   the processor generating a superimposed image by superimposing the synthesized image on the original image to generate a superimposed image, wherein the synthesized image appears at the determined position of the original image; and
   live streaming the superimposed image.

2. The live streaming method of claim 1, wherein in the superimposed image, the synthesized image is a sub-image window, a text window, a zoom window, a handwriting window, or a combination thereof.

3. The live streaming method of claim 1, wherein the step of the processor detecting the prompt signal in the original image includes detecting a light spot having a predefined color or shape in the original image.

4. The live streaming method of claim 1, further comprising the processor receiving a second image, wherein the synthesized image is generated from the second image.

5. The live streaming method of claim 1, further comprising the processor receiving an image processing signal from the external controller, wherein the synthesized image is generated based on both the detected prompt signal and the image processing signal.

6. The live streaming method of claim 5, wherein the image processing signal is a zoom signal, and wherein the synthesized image contains an enlarged image of a portion of the original image located the determined position.

7. The live streaming method of claim 5, wherein the image processing signal is a writing signal, the method further comprising:
   in response to receiving the writing signal, the processor tracing a trajectory of the detected prompt signal, and
   wherein the step of processing the original image to generate the synthesized image includes generating the synthesized image based on the trajectory of the prompt signal.

8. The live streaming method of claim 7, wherein the step of generating the synthesized image based on the trajectory of the prompt signal includes recognizing text or predefined patterns in the trajectory and generating the synthesized image based on the recognized text or patterns.

9. A live streaming system, adapted to be connected to a first camera, the system comprising:
a user-operable, hand-held and dynamically movable controller, configured to generate an illuminating light to form a prompt signal in a physical scene to be imaged by the first camera and cause the prompt signal to appear at a position of the physical scene defined solely by a position and/or orientation of the hand-held controller; and
an electronic device, configured to be communicatively connected to the controller and the first camera, the electronic device including:
a processor, configured to receive an original image captured by the first camera, the original image being an image of the physical scene and including the prompt signal, to recognize the prompt signal in the original image as captured by the first camera, to generate a synthesized image, to analyze the prompt signal to determine a position within the original image where the synthesized image is to appear, and to generate a superimposed image by superimposing the synthesized image on the original image, wherein the synthesized image appears at the determined position of the original image; and
a network interface unit, configured to live stream the superimposed image.

10. The live streaming system of claim 9, wherein the controller is further configured to transmit an image processing signal to the processor, and wherein the processor is configured to determine a content of the synthesized image and the position where the synthesized image is to appear based on the received image processing signal and the prompt signal.

11. The live streaming system of claim 9, wherein the system is further adapted to be connected to a second camera, wherein the processor is further configured to receive a second image captured by the second camera and to generate the synthesized image based on the second image.

12. The live streaming system of claim 9, wherein in the superimposed image, the synthesized image is a sub-image window, a text window, a zoom window, a handwriting window, or a combination thereof.

13. The live streaming system of claim 9, wherein the processor is configured to detect a light spot having a predefined color or shape in the original image as the prompt signal.

14. The live streaming system of claim 9, wherein the controller is further configured to transmit a zoom signal to the processor, and wherein processor is configured to generate, in response to receiving the zoom signal, an enlarged image of a portion of the original image located at the determined position as the synthesized image.

15. The live streaming system of claim 9, wherein the controller is further configured to transmit a writing signal to the processor, and wherein processor is configured to trace a trajectory of the prompt signal and generate the synthesized image based on the trajectory in response to receiving the writing signal.

16. The live streaming system of claim 15, wherein the processor is further configured to recognize text or predefined patterns in the trajectory of the prompt signal and to generate the synthesized image based on the recognized text or pattern.

17. The live streaming method of claim 1, wherein the external controller generates the illuminating light using a light source of the external controller, the method further comprising operating a user-operable switch of the external controller to control the light source.

18. The live streaming system of claim 9, wherein the controller includes a light source configured to emit the illuminating light, and a user-operable switch configured to operate the light source.

* * * * *